Patented July 21, 1942

2,290,180

UNITED STATES PATENT OFFICE 2,290,180

POLYVINYL ACETAL SHEET MATERIAL

Albert Hershberger, Buffalo, N. Y., assignor to E. I. du Pont de Nemours & Company, Wilmington, Del., a corporation of Delaware No Drawing. Application July 1, 1939, Serial No. 282,461

8 Claims. (Cl. 260—36)

This invention relates to transparent polyvinyl acetal sheet materials of high durability, flexibility and resistance to tear, and more particularly to polyvinyl butyral films softened with castor oil.

Transparent sheet materials have recently become very popular as wrapping and packaging materials, and for fashioning garments, as well as shower curtains, bridge table covers, umbrellas, parasols, etc.

Quite a number of materials are now available for use as transparent sheet wrapping material. Among these are regenerated cellulose, rubber hydrochloride, polyvinyl alcohol, polyvinyl acetal, etc. Wrapping material used for packaging is seldom subjected to tearing, and since commodities are packaged so as to present a continuous and unbroken surface of the wrapping material, it is possible to use a film that exhibits a very low resistance to tearing. Once a tear is started, as, for example, by a break in the edge, a puncture of the film, or any other means, some films such as those produced from regenerated cellulose, will rupture very readily by means of the propagation of the tear. The perforations caused by a sewing needle start a tear which in some materials, such as regenerated cellulose sheet, may be readily propagated, especially along the line of perforations produced by sewing. For this reason, these materials with a low tear resistance cannot be used in fashioning articles in which a sewing operation is employed.

For the manufacture of rain coats, shower curtains, umbrellas, etc., it is highly desirable that that materials used be of such characteristics that they can be readily stitched or sewn (as by a sewing machine).

This invention had for an object the production of films of great durability. A further object was to produce transparent films with high tear resistance and flexibility. A still further object was to provide new and improved softening materials for sheets of polyvinyl acetal compositions. A general advance in the art, and other objects which will appear hereinafter, are also contemplated.

It has now been found that transparent polyvinyl acetal films or sheets softened with castor oil are sufficiently flexible and tear resistant to be suitable for the manufacture of sewn garments, and the like.

Such films are prepared from dispersions or dopes comprising the appropriate polyvinyl acetal resin, castor oil and solvent material. The dopes are spread upon a smooth surface in a thin layer and the solvents evaporated according to methods well known in the art.

From the following description and specific examples, in which are disclosed certain embodiments of the invention as well as details of what is believed to be the best mode for carrying out the invention, it will be apparent how the foregoing objects and related ends are accomplished. Parts are given by weight throughout the specification.

Example I

A dope was prepared consisting of 15.8% of polyvinyl butyral (hydroxyl 19%, butyral 80%, acetyl 1%), 4.2% castor oil, and 80% of methanol. A thin layer of this dope was spread upon glass plates and the solvent methanol allowed to evaporate. A glass-clear, transparent film .001 inch thick resulted and was stripped from the glass surface. The film was found to be not only perfectly transparent, but exceptionally tough and durable, and did not exhibit the common tendency to tear when subjected to stitching. Raincoats fashioned in the usual manner from this material withstood ordinary usage for a considerable and satisfactory period of time.

Example II

A dope consisting of 17% of polyvinyl isobutyral (hydroxyl 14%, isobutyral 85%, acetyl 1%), 3% castor oil, and 80% of methanol, was cast in a continuous manner upon the polished surface of a large diameter drum. Upon evaporation of the solvent, a highly transparent and durable film resulted. This film was .001 inch thick, had a high tear resistance, and was vastly superior to similar films available heretofore under conditions of low temperatures.

Example III

A film was prepared from a dope consisting of 19% of polyvinyl benzal-butyral (hydroxyl 15%, benzal 25%, isobutyral 55%, acetyl 5%), 1% of castor oil, and 80% of methanol. Upon evaporation of the solvent, a highly transparent and durable film was obtained which was resistant to sticking tears at all temperatures in the range —10° C. to well above room temperature. The film was not subject to deformation through plastic flow to any detrimental extent until a temperature of 100° C. had been reached.

Example IV

A film was prepared by evaporating the solvent from a composition consisting of 17% polyvinyl formal (hydroxyl 2%, formal 90%, acetyl 8%), 3% of castor oil and 80% of a benzene methanol solvent. The film was found to be extremely durable and not to tear readily under a wide variety of temperatures.

*Example V*

A dope consisting of:

| | Parts |
|---|---|
| Polyvinyl butyral | 6.3 |
| Polyvinyl isobutyral | 6.8 |
| Polyvinyl formal | 3.8 |
| Castor oil (crystal grade) | 3.1 |
| Methanol | 70.0 |
| Ethyl formate | 10.0 | was cast continuously on the polished surface of a rotating nickel cylinder ten feet in diameter. The volatile materials were evaporated, and the resulting film stripped from the surface of the casting wheel. The film, which had a thickness of .0013 inch, was very clear, could be satisfactorily sewed, and had excellent tear resistance.

*Example VI*

A dope consisting of:

| | Percent |
|---|---|
| Polyvinyl butyral (Example I type*) | 5 |
| Alvar type of resin (hydroxyl 10%, acetal 80%, acetyl 10%) | 5 |
| Polyvinyl formal (Example IV type) | 5 |
| Castor oil | 3 |
| Methanol | 33 |
| Benzene | 49 |

*(That is, hydroxyl corresponding to 19% polyvinyl alcohol, butyral corresponding to 80% polyvinyl butyral and acetyl corresponding to 1% polyvinyl acetate.)

was cast continuously on the polished surface of a rotating nickel cylinder six feet in diameter. The volatile materials were evaporated, and the resulting film stripped from the surface of the casting wheel. The film, which had a thickness of .00088 inch, was very clear, could be satisfactorily sewed, and had excellent tear resistance.

*Example VII*

A film was prepared by evaporating the solvent from a composition consisting of 17% polyvinyl formal (hydroxyl 2%, formal 90%, acetyl 8%), 3% of castor oil, 64% methyl acetate, 2% water and 14% methanol. The film was found to be extremely durable and not to tear readily under a wide variety of temperatures.

The polyvinyl acetal type resins in general, such as, for example, polyvinyl formals, polyvinyl butyrals, polyvinyl iso-butyrals, polyvinyl benzals, and the alvar type of acetals (the polyvinyl acetals themselves), are suitable for use in this invention. The polyvinyl acetal component of the film may comprise mixtures of polyvinyl acetals and interpolymers from different acetal forming radicals. The straight polyvinyl butyrals are outstanding and constitute greatly preferred embodiments of the invention.

All grades of castor oil function to soften the polyvinyl acetal. In addition to the "crystal" and "#3" grades, the blown products which have a slightly higher viscosity may be employed. Usually not more than 30% of the film need be castor oil.

Suitable solvents for use in connection with this invention are those which are solvents for both the resins and the castor oil. Among these may be mentioned methanol, acetone and ethyl formate. Mixtures such as 60% methanol with 40% benzene, 80% methyl acetate with 20% methanol, and the like, are quite satisfactory.

A suitable stabilizer for the castor oil, such as beta-naphthol, phenyl salicylate, eugenol, creosole, guaiacol, syringic acid, catechol monolauryl ether and ortho-hydroxy-diphenyl, may be incorporated to prevent the development of rancidity and objectionable odor. The compounds listed constitute a preferred group, particularly because they do not promote decomposition of the acetal and do not tend to discolor when exposed to ultraviolet light. Other stabilizers for castor oil, such as diphenyl amine, tetra-hydrophenyl-beta-naphthylamine and the materials mentioned in the patent literature, may also be used in specific situations.

The thickness of the pellicle may, in accordance with common casting practice, be varied to suit particular needs. Most of the material prepared will have a thickness in the range .00088 to .0022 of an inch. A thickness of about .001 of an inch is suitable for most purposes, including, for example, material desirable for the manufacture of garments such as raincoats and mittens.

The present invention does not exclude the presence of small proportions of other film formers and plasticizers so long as the basic advance in the art is present.

Polyvinyl acetal films softened with castor oil are vastly supervisor to any other films available heretofore for certain purposes, such as those described above. They have a high resistance to tearing which makes them suitable for stitching or close sewing (at least 10 stitches per inch) in which long lines of perforations are particularly conducive to tearing. Furthermore, they are suitable where a product is to be perforated for the purpose of allowing entrance of fluid, either for ventilation or for the admission of liquid. For example, tea bags may be formed of the films of the sheet material of this invention by perforating and wrapping therein tea leaves or suitable extractable materials. In many cases it is desirable to perforate areas of sheeting in order to give ventilation to enclosed articles. It is also desirable to form windows or certain cutout portions in wrappers which will not otherwise weaken the wrapper, as by tearing. The new material is admirably suited to such purposes.

It is highly desirable to have a transparent film which is highly flexible and which resembles in this respect the limpness and feel of fabric. Not only must the material have the necessary degree of flexibility, but it must be sufficiently tough and durable to subject it to folds and creases and continued flexing to approximate the durability of fabrics. In this respect, the transparent material of this invention is superior to other transparent materials heretofore available, and especially is this true when considered over a wide range of temperature, and relative humidity.

It is most important that these compositions used for transparent films shall be stable over long periods of time in order that durable and lasting articles may be fashioned therefrom. Many of the prior art materials have been most unsatisfactory in this respect. The compositions of the present invention give a film which is of lasting durability and not subject to deterioration which will result in unsightly discolorations and blemishes, as well as a weakening of the film.

Films of the present invention are superior to many other transparent films heretofore available in that they remain stable and undistorted at relatively high temperatures.

The above-noted advantages of the products and films of this invention cause it to be peculiarly well adapted to the fashioning of such articles of clothing as raincoats, in which the material must be not only weather-resistant and waterproof, but durable as regards wearing qualities and ability to be folded into small and compact bundles. In the fashioning of raincoats, it is desirable that the seams be formed by stitching and the great freedom from tearing, that this material exhibits, makes it particularly well adapted for such methods of fashioning. Another related use is that of parasol and umbrella coverings, which, in addition to requiring high tensile strength and durability in order to stand the stretching of the ribs, must be resistant to tearing and to the demands that stitching places upon the film, and also to deformation at relatively high temperatures which may be encountered in direct sunlight, as well as the detrimental influence of the ultra-violet rays of sunshine. In all of these respects, this material is unequalled and greatly superior to the materials available heretofore.

In addition to the advantageous properties mentioned above may be added that of a completely non-tacky surface which will not adhere to other surfaces when subjected to pressure, nor is the surface affected by many common liquids and materials which may come in contact with it.

As many apparently widely different embodiments of this invention may be made without departing from the spirit and scope thereof, it is to be understood that I do not limit myself to the specific embodiments thereof except as defined in the appended claims.

I claim:

1. Flexible non-tacky, plasticized polyvinyl butyral pellicle of a thickness of about .001 to .002 of an inch, the plasticizing material consisting of not less than 5.2% and not more than 30% castor oil.

2. Transparent flexible polyvinyl butyral film about .001 of an inch in thickness and containing plasticizing material, the said plasticizing material consisting of not less than 5.2% and not more than 30% castor oil, said film being non-tacky, and non-tearing when stitched with 10 stitches per inch.

3. A transparent, flexible plasticized pellicle of polyvinyl butyral, the plasticizing material consisting of not less than 5.2% and not more than 30% castor oil, said pellicle being non-tacky, non-tearing when stitched, and non-deforming at temperatures well above room temperature.

4. The pellicle of claim 3 when the thickness is 0.001 to 0.002 of an inch.

5. A film of polyvinyl butyral (hydroxyl 19%, butyral 80%, acetyl 1%) plasticized with about 20% castor oil, said film being about 0.001 inch thick.

6. Sheet material 0.00088 to 0.0022 of an inch thick, comprising essentially polyvinyl butyral and plasticizer, the said plasticizer consisting of castor oil in an amount more than 5.2% but not exceeding 30%, said sheet material being non-tacky and resistant to tearing when sewed with 10 stitches per inch.

7. Sheet wrapping film consisting of:

| | Parts |
|---|---|
| Polyvinyl butyral | 6.3 |
| Polyvinyl isobutyral | 6.8 |
| Polyvinyl formal | 3.8 |
| Castor oil | 3.1 |

8. Polyvinyl acetal sheet wrapping material consisting of 17 parts of polyvinyl acetal and 3 parts of castor oil, the said acetal having a substituent percentage of hydroxyl 14%, acetal 85% and acetyl 1%, and the said acetal radical being a butyral radical.

ALBERT HERSHBERGER.